United States Patent
Ajith et al.

(10) Patent No.: US 11,194,665 B2
(45) Date of Patent: Dec. 7, 2021

(54) SYSTEMS AND METHODS FOR SEAMLESS REDELIVERY OF MISSING DATA

(71) Applicant: Walmart Apollo, LLC, Bentonville, AR (US)

(72) Inventors: Govind Ajith, Bengaluru (IN); Vamsi Krushna Lingala, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/033,039

(22) Filed: Sep. 25, 2020

(65) Prior Publication Data

US 2021/0096955 A1 Apr. 1, 2021

Related U.S. Application Data

(60) Provisional application No. 62/934,905, filed on Nov. 13, 2019.

(30) Foreign Application Priority Data

Sep. 26, 2019 (IN) .............................. 201941038860

(51) Int. Cl.
*G06F 11/14* (2006.01)
*G06Q 30/06* (2012.01)

(52) U.S. Cl.
CPC ..... *G06F 11/1415* (2013.01); *G06Q 30/0619* (2013.01); *G06F 2201/84* (2013.01)

(58) Field of Classification Search
CPC ............. G06F 11/1415; G06F 11/1443; G06F 11/1469; G06F 11/1471; G06F 11/1474; G06F 2201/84; G06F 2201/87
See application file for complete search history.

(56) References Cited

U.S. PATENT DOCUMENTS

| 6,353,834 B1 | 3/2002 | Wong |
| 6,434,605 B1 | 8/2002 | Faulkner |

(Continued)

OTHER PUBLICATIONS

Narkhede, N; "Kafka Replication"; https://cwiki.apache.org/confluence/display/KAFKA/Kafka+Replication; Feb. 2, 2013; pp. 1-4.

(Continued)

*Primary Examiner* — Matthew M Kim
*Assistant Examiner* — Kurosu Risa Altaf
(74) *Attorney, Agent, or Firm* — Fitch, Even, Tabin & Flannery LLP

(57) ABSTRACT

In some embodiments, apparatuses and methods are provided herein useful to providing seamless redelivery of missing data from a message broker to a requesting client computer. In some embodiments, there is provided a system for providing seamless redelivery of missing data including a requesting client computer generating a first data request in response to a user's e-commerce activity over an internet; a message broker comprising one or more first control circuits; a backup control circuit configured to copy a plurality of messages as a plurality of object data into an object store; and a reconciliation control circuit configured to: receive a second data request in response to a determination by the requesting client computer that a data loss has occurred; download the missing data from the object store; and provide the missing data to the message broker.

20 Claims, 4 Drawing Sheets

(56) References Cited

U.S. PATENT DOCUMENTS

| | | |
|---|---|---|
| 6,934,247 B2 | 8/2005 | Bhattal |
| 7,203,706 B2 | 4/2007 | Jain |
| 8,261,286 B1 * | 9/2012 | Fateev .................... H04L 67/32 |
| | | 719/314 |
| 8,639,965 B1 | 1/2014 | Anugu |
| 8,898,520 B1 | 11/2014 | Ford |
| 9,753,818 B2 | 9/2017 | Vlachogiannis |
| 2019/0097962 A1 * | 3/2019 | Young ................... H04L 51/066 |

OTHER PUBLICATIONS

Rabbitmq; "Highly Available (Mirrored) Queues"; https://www.rabbitmq.com/ha.html; May 3, 2019; pp. 1-16.
Sinha, S.; "What is Kafka?"; https://www.quora.com/What-is-Kafka; Jun. 4, 2018; pp. 1-3.
Sookocheff, K; "Kafka in a Nutshell"; https://sookocheff.com/post/kafka/kafka-in-a-nutshell/; Sep. 25, 2015; pp. 1-21.
Wikipedia; "Object Storage"; https://en.wikipedia.org/wiki/Object_storage; Available as early as Jul. 1, 2019; pp. 1-10.

* cited by examiner

SYSTEMS AND METHODS FOR SEAMLESS REDELIVERY OF MISSING DATA

CROSS-REFERENCE TO RELATED APPLICATIONS

This application claims the benefit of the following Indian Provisional Application 201941038860 filed Sep. 26, 2019 and the following U.S. Provisional Application No. 62/934,905 filed Nov. 13, 2019, all of which are incorporated herein by reference in their entirety.

TECHNICAL FIELD

This invention relates generally to redelivery of missing data after data loss.

BACKGROUND

Generally, a message broker receives requests from and sends requested data to multiple client computers. At times, when the requested data is incomplete or entirely not received by the requesting client computer, the requesting client computer may send a request for the missing data. Generally, the missing data is still locally accessible to the message broker. As such, the message broker will just send the missing data. However, if the missing data is no longer locally accessible, the message broker will send a request for the missing data to the source server, thereby creating delay at the requesting client computer and/or inefficiency in the network.

BRIEF DESCRIPTION OF THE DRAWINGS

Disclosed herein are embodiments of systems, apparatuses and methods pertaining to providing seamless redelivery of missing data from a message broker to a requesting client computer after an occurrence of an event leading to data loss. This description includes drawings, wherein.

Figure 1:
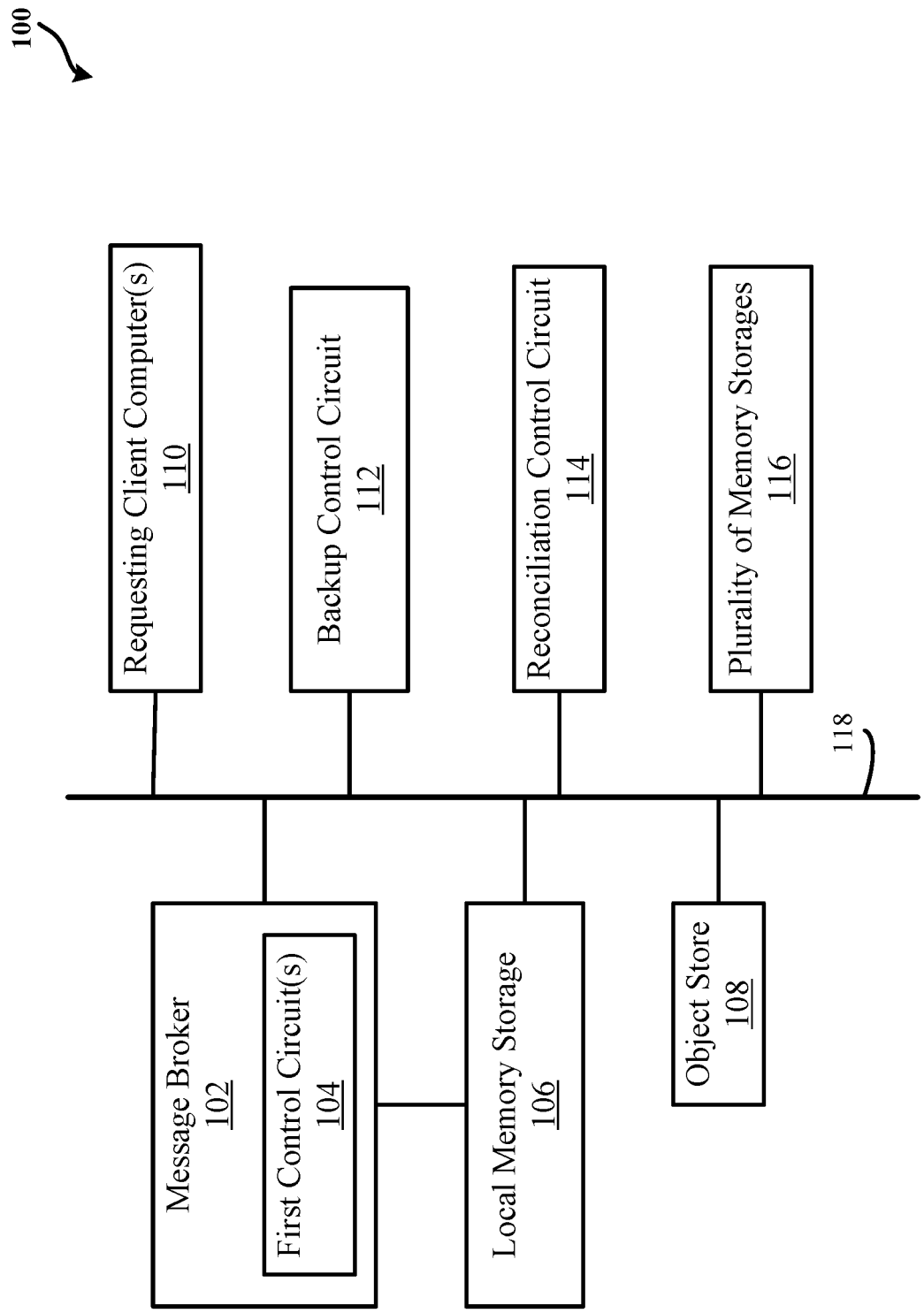
FIG. 1 illustrates a simplified block diagram of an exemplary system for providing seamless redelivery of missing data in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for providing seamless redelivery of missing data. In some embodiments, a system for providing seamless redelivery of missing data from a message broker to a requesting client computer after an occurrence of an event leading to data loss including a requesting client computer of a plurality of requesting client computers generating a first data request in response to a user's e-commerce activity over an internet. By one approach, the system may include a message broker. For example, the message broker may include one or more first control circuits cooperatively working together as a plurality of nodes servicing a plurality of requests from the plurality of requesting client computers. In one configuration, each node of the plurality of nodes may correspond to a broker of a plurality of brokers. In such a configuration, each broker of the plurality of brokers may be associated with a local memory storage. By one approach, the local memory storage may include one or more partitions configured to store one or more messages of a plurality of messages sent to and received by the message broker in accordance with a first durational time. In some implementations, the system may include a backup control circuit coupled to the message broker via the internet. By one approach, the backup control circuit may copy the plurality of messages as a plurality of object data into an object store in accordance with a second durational time. In one scenario, the second durational time is greater than the first durational time.

Alternatively or in addition to, the system may include the object store. For example, the object store may store a plurality of object data and/or may couple to the backup control circuit. By one approach, the object store may include the plurality of memory storages remote from the local memory storage associated with each broker. In some implementations, the system may include a reconciliation control circuit. By one approach, the reconciliation control circuit may couple to the object store and/or the message broker. For example, the reconciliation control circuit may receive a second data request in response to a determination by the requesting client computer that a data loss has occurred. In some configurations, the second data request may include a first group, a first partition, and/or a first offset associated with a missing data due to a data loss. Alternatively or in addition to, the reconciliation control circuit may, in response to the receipt of the second data request, download the missing data from the object store. Alternatively or in addition to, the reconciliation control circuit may provide the missing data to the message broker in response to the download of the missing data. By one approach, the requesting client computer may receive the missing data from the message broker.

In some embodiments, a method for providing seamless redelivery of missing data from a message broker to a requesting client computer after an occurrence of an event leading to data loss may include generating, by a requesting client computer of a plurality of requesting client computers, a first data request in response to a user's e-commerce activity over an internet. By one approach, the method may include copying, by a backup control circuit coupled to a message broker via and internet, a plurality of messages as a plurality of object data into an object store in accordance with a second durational time. In one configuration, the message broker may include one or more first control circuits cooperatively working together as a plurality of nodes servicing a plurality of requests from the plurality of requesting client computers. For example, each node of the plurality of nodes may correspond to a broker of a plurality of brokers. In such an example, each broker of the plurality of brokers may be associated with a local memory storage. In some configurations, the local memory storage may include one or more partitions that store one or more messages of the plurality of messages sent to and/or received by the message broker in accordance with a first durational time. By one approach, the second durational time is greater than the first durational time. Alternatively or in addition to, the object store may store the plurality of object data. In one scenario, the object store may couple to the backup control circuit. In such a scenario, the object store may include a plurality of memory storages remote from the local memory storage associated with each broker.

In some implementations, the method may include receiving, by a reconciliation control circuit coupled to the object store and/or the message broker, a second data request in response to a determination by the requesting client computer that a data loss has occurred. For example, the second data request may include a first group, a first partition, and/or a first offset associated with a missing data due to the data loss. In one configuration, the method may include downloading the missing data from the object store in response to receiving the second data request. Alternatively or in addition to, the method may include providing the missing data to the message broker in response to the downloading of the missing data. By one approach, the requesting client computer may receive the missing data from the message broker.

To illustrate, FIGS. 1-4 are described below. FIG. 1 illustrates a simplified block diagram of an exemplary system 100 for providing seamless redelivery of missing data in accordance with some embodiments. The system 100 includes a message broker 102 communicatively coupled to one or more requesting client computers 110 via a network 118. By one approach, the message broker 102 may include one or more first control circuits 104. In some implementations, the one or more first control circuits 104 may be grouped into a plurality of nodes. For example, one or more of the one or more first control circuits 104 may be grouped into a first node and/or a first set of nodes of the plurality of nodes. In another example, another one or more of the one or more first control circuits 104 may be grouped into a second node and/or a second set of nodes of the plurality of nodes. In such examples, one or more nodes of the plurality of nodes may correspond to a broker of a plurality of brokers. In some configurations, each broker of the plurality of brokers may be associated with one or more local memory storages 106. By one approach, the one or more local memory storages 106 may include one or more partitions configured to store one or more messages of a plurality of messages sent to and received by the message broker 102 in accordance with a first durational time. As such, the message broker 102 may include the one or more first control circuits 104 cooperatively working together as the plurality of nodes servicing a plurality of requests from a plurality of requesting client computers 110. In some embodiments, the message broker 102 may include a distributed computing environment, a server, a cloud computer, to name a few. In some configurations, the one or more requesting client computers 110 may include a computer associated with a consumer, a smartphone, a laptop, a tablet, a smartwatch, a server associated with a retailer, a database server, among other types of electronic devices capable of executing and/or running one or more client programs. In another configurations, the network 118 may include Internet, wired and/or wireless networks, Wi-Fi, Bluetooth, local area network, wide area network, among other types of networks capable of coupling one electronic device to another electronic devices.

By one approach, a local memory storage 106 may include one or more solid state drives, solid-state devices, solid-state disks, nonvolatile flash memories, among other type of storage devices capable of storing data in semiconductor cells. In some implementations, the system 100 may include a backup control circuit 112. By one approach, the backup control circuit 112 may be coupled to the message broker 102 via the network 118. In some implementations, the backup control circuit 112 may include a standalone server, a distributed computing processors, a cloud server, a computer, a microcomputer, a microprocessor, to name a few. In some configurations, the backup control circuit 112 may copy the plurality of messages sent to and received by the message broker 102 as a plurality of object data into an object store 108. For example, the plurality of messages may be stored as a plurality of object data into the object store 108 in accordance with a second durational time. By one approach, the object store 108 may be coupled to the backup control circuit 112 via the network 118. In such an approach, the object store 108 may include a plurality of memory storages 116 remote from the local memory storage 106 associated with each broker. For example, the plurality of memory storages 116 may include hard disk drives, hard disks, hard drives, fixed disks, among other types of electro-mechanical data storage devices that use magnetic storage to store and retrieve digital information. In some configurations, the plurality of memory storages 116 and/or the local memory storages 106 may include hybrid drives and solid-state hybrid drives. As such, data stored in the local memory storage 106 are associated with the first durational time while data stored in the plurality of memory storages 116 are associated with the second durational time. By one approach, the local memory storages 106 have a faster access time, a faster throughput, and/or less data latency relative to the plurality of memory storages 116. By another approach, the local memory storages 106 may include one or more pieces of computer equipment on which information is stored and accessed faster than the plurality of memory storages 116. By another approach, the second durational time is greater than the first durational time. In one scenario, the first durational time may include a time less than a day and/or a time less than a 24-hour period.

In some configuration, the system 100 may include a reconciliation control circuit 114. By one approach, the reconciliation control circuit 114 may be coupled to the object store 108 and/or the message broker 102 via the network 118. In some implementations, the requesting client computer 110 may generate a first data request. By one approach, the first data request may be in response to a user's e-commerce activity over an internet. For example, the user's e-commerce activity may include one or more retail activities at an e-commerce website, streaming video, and/or streaming music, to name a few. In some embodiments, the reconciliation control circuit 114 may receive a second data request in response to a determination by the requesting client computer 110 that a data loss has occurred. For example, the data loss may occur when an error occurred in the requesting client computer 110 (e.g., application error, hardware error, communication error, network error, etc.). In another example, the data loss may occur when an error occurred in the message broker 102 (e.g., software error, hardware error, communication error, network error, etc.). In yet another example, the data loss may occur when an error occurred in the network 118 (e.g., cable, network equipment error, etc.).

In some configurations, the second data request may include a first group, a first partition, and/or a first offset associated with a missing data due to the data loss. For example, the requesting client computer 110 may generate a data request (e.g., send message) by writing into a group of a plurality of groups. In one example, the plurality of groups may correspond to categories and/or feed names to which messages are stored and published (e.g., read by a client computer). In one scenario, the group may include a topic. By one approach, the group may be associated with and/or divided into a plurality of partitions. In such an approach, one or more partitions of the plurality of partitions may be associated with one or more brokers of the plurality of brokers. As such, multiple requesting client computers 110 may write (e.g., generate/send data request) and/or read (e.g., receive) messages from the message broker 102. Alternatively or in addition to, a message may be stored across one or more partitions. In some implementations, the requesting client computer 110 may send a message to a particular group. In such an implementation, the requesting client computer 110 may read from another particular group. By one approach, each message in a partition may be associated with an identifier and/or an offset. Thus, after determining that a data loss has occurred, the requesting client computer 110 may send a data request to the message broker 102 for the missing data. For example, the data request may include a first group, a first partition, and/or a first offset associated with the missing data due to the data loss. To illustrate, the missing data may be associated with a group "pricingChanges" stored in a first partition having an offset from 10200 to 11700 range. Alternatively or in addition to, the reconciliation control circuit 114 may download the missing data from the object store 108 in response to the receipt of the second data request. Alternatively or in addition to, the reconciliation control circuit 114 may provide the missing data to the message broker 102 in response to downloading the missing data. By one approach, the requesting client computer 110 may receive the missing data from the message broker 102. In some implementation, the reconciliation control circuit 114 may include a standalone server, a distributed computing processors, a cloud server, a computer, a microcomputer, a microprocessor, to name a few. In other configurations, the message broker 102, the reconciliation control circuit 114, and/or the backup control circuit 112 may be part of a computer cluster. In yet another configurations, the one or more first control circuits 104, the backup control circuit 112, and/or the reconciliation control circuit 114 are each distinct and separate control circuits. In yet another configurations, the object store 108 may only receive the messages and/or the plurality of object data from the backup control circuit 112. In yet another configurations, the object store 108 may only provide the missing data to the reconciliation control circuit 114. Alternatively or in addition to, the reconciliation control circuit 114 may be the only one to download object data from the object store 108.

In some embodiments, each message of the one or more messages received at the message broker 102 may be associated with a corresponding group of a plurality of groups, a corresponding partition of the one or more partitions, and/or a corresponding offset within the corresponding partition. In an illustrative non-limiting example, a first group may be associated with a first partition, a second partition and a third partition. Alternatively or in addition to, a second group may be associated with a third partition and a fourth partition. Continuing the illustrative non-limiting example, the message broker 102 may receive a first message and a second message. By one approach, the first message may be associated with, written to and/or stored in across the first partition, the second partition and the third partition. By another approach, the second message may be associated with, written to and/or stored in across the third partition and the fourth partition. In one scenario, the first message may correspond to a data request from the requesting client computer 110. In such a scenario, the requesting client computer 110 may determine that the data received from the message broker 102 are incomplete (e.g., the missing data corresponding to a group "pricingChanges" stored in a first partition with an offset from 10200 to 11700 range). As such, the requesting client computer 110 may send a request for the missing data (e.g., the second message). The missing data request may include the group "pricingChanges", the first partition, the offset from 10200 to 11700 range. By one approach, the second message may be associated with, written to and/or stored in across the third partition and the fourth partition. Alternatively or in addition to, the reconciliation control circuit 114 may read the second message stored across the third partition and the fourth partition. In response, the reconciliation control circuit 114 may download from the object store 108 the missing data based on the group "pricingChanges", the first partition, and/or the offset from 10200 to 11700 range. Once downloaded, the reconciliation control circuit 114 may write and/or store the missing data into a third group associated with a sixth partition. In one configuration, the requesting client computer 110 may be notified, alerted, and/or after a predetermined period of time perform a read of the third group (e.g., accessing the stored data in the sixth partition). In some implementation, the reading of the third group may provide the requesting client computer 110 the missing data.

In some implementations, when the backup control circuit 112 copies the plurality of messages as a plurality of object data into the object store 108, each object data of the plurality of object data may be stored in the object store 108 with a particular naming format that includes the corresponding group, the corresponding partition, and the corresponding offset of the copied message. For example, the group "pricingChanges" stored in the first partition with the offset from 10200 to 11700 range may be stored as an object data having an object name of "pricingChanges_first partition_10200_11700". In some configurations, the reconciliation control circuit 114 may perform a search of a first object data (e.g., the group "pricingChanges" stored in the first partition with the offset from 10200 to 11700 range) corresponding to the missing data by finding one or more set of object data that match a first naming format corresponding to the first group and the first partition of the missing data in a plurality of naming formats associated with the plurality of object data stored in the object store. For example, the reconciliation control circuit 114 may initially search for all stored object data having a first portion and a second portion of the naming format that correspond to "pricingChanges_first partition". By another approach, the reconciliation control circuit 114 may determine the first object data from the one or more set of object data based on a determination that an identified offset associated with one of the one or more set of object data includes the first offset associated with the missing data. For example, the reconciliation control circuit 114 may determine which one of the found stored object data having the first and second portions of the naming format corresponding to "pricing Changes_first partition" has a third portion of the naming format that corresponds to the "10200_11700". In such an example, after finding the object data having the naming format that corresponds to "pricingChanges_first partition_10200_11700", the reconciliation control circuit 114 may download the missing data from the object store 108 where the downloaded missing data may include the first object data associated with the naming format "pricingChanges_first partition_10200_11700". In some implementations, the reconciliation control circuit 114 may write and/or store the first object data into the third group associated with the sixth partition, as described above. In some configurations, the message broker 102 may store the missing data received from the reconciliation control circuit 114 in a particular partition associated with a particular group accessible only by the requesting client computer 110 (e.g., the third group).

In some embodiments, all messages received by the message broker 102 (from the requesting client computer 110 and/or source computer and/or server providing the requested data and/or sourcing the requested data) may be stored in one or more the local memory storages 106 for immediate access (e.g., accessed within a day and/or within 24 hours). By one approach, all messages stored in the local memory storages 106 may be copied into the object store 108 as object data by the backup control circuit 112. In one configuration, each message may be stored and/or associated with a naming format including a corresponding group associated with the message, a corresponding partition associated with the corresponding group, and/or a corresponding offset within the corresponding partition. In one example, each object data stored in the object store 108 may be associated with a durational time that is longer than the durational time associated with messages stored in the local memory storage 106. In some embodiments, the backup control circuit 112, the reconciliation control circuit 114, and/or the object store 108 are not part of a database storage system where a single database server executes a database application (e.g., Oracle, MySQL, and/or the like) that stores, manages and retrieves stored data. For example, the backup control circuit 112 and the reconciliation control circuit 114 are distinct and remote from one another.

Figure 2:
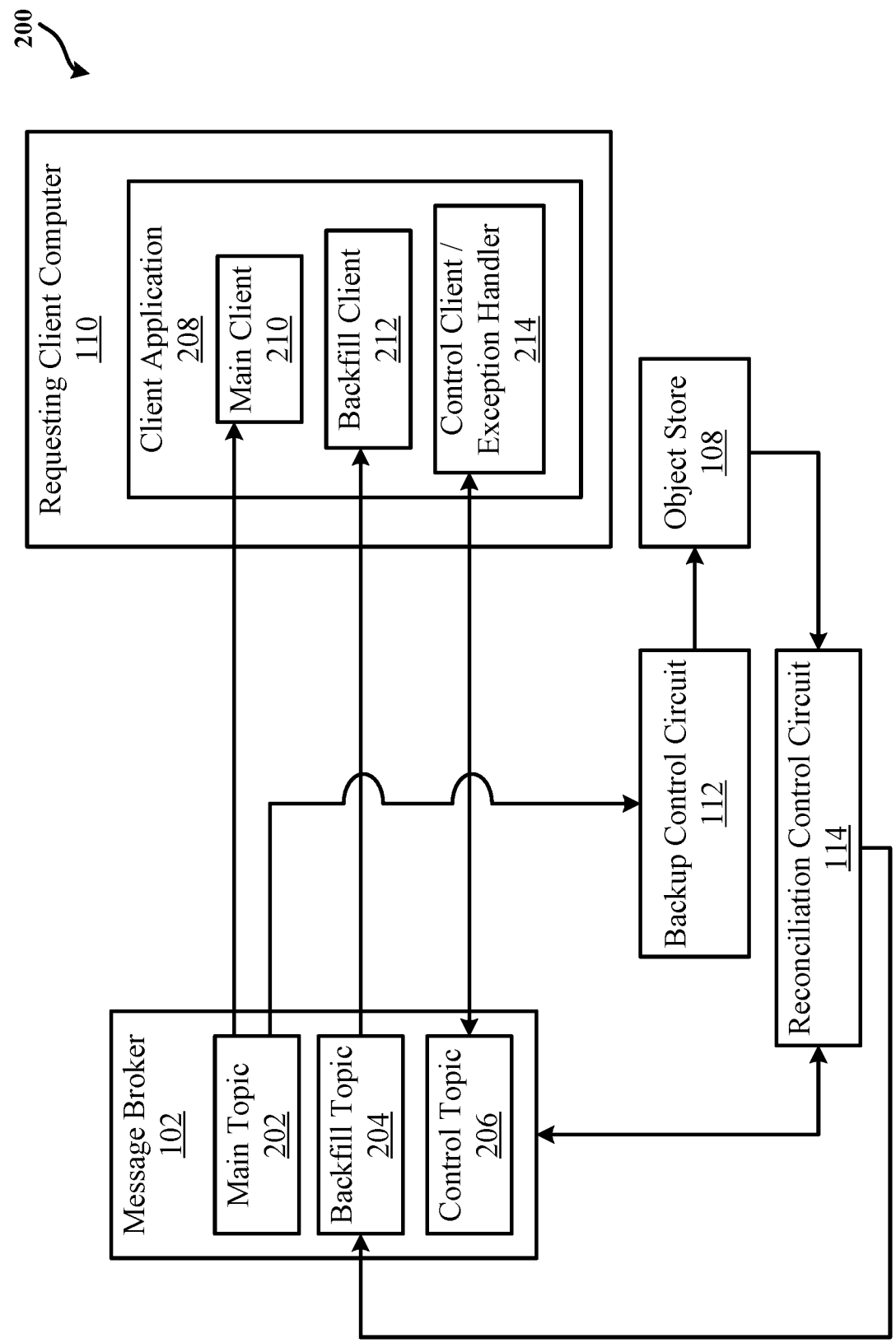
FIG. 2 illustrates a simplified block diagram of an exemplary system for providing seamless redelivery of missing data in accordance with some embodiments.
Figure 3:
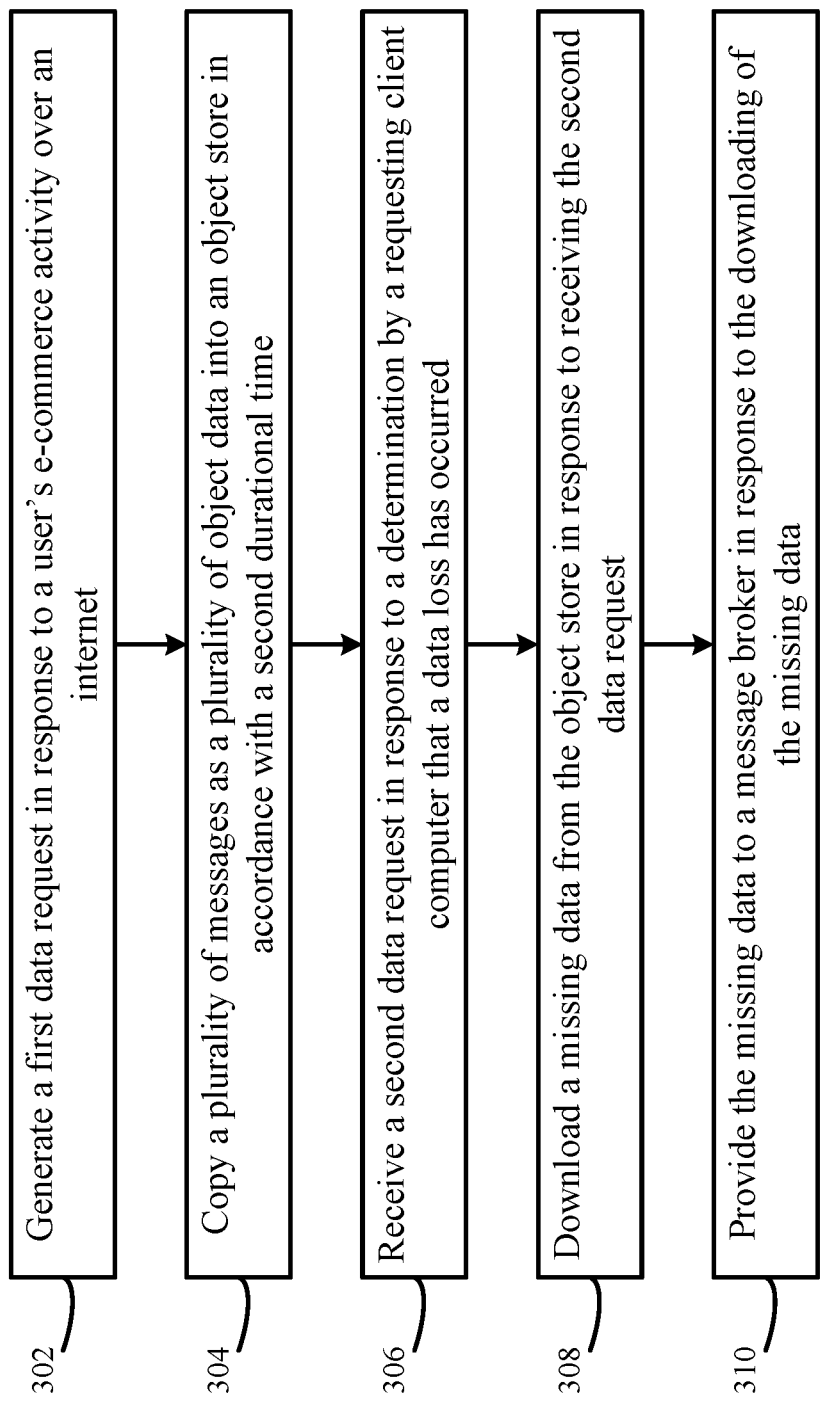
FIG. 3 shows a flow diagram of an exemplary process of providing seamless redelivery of missing data in accordance with some embodiments.

To further illustrate, FIGS. 2 and 3 are described below along with one or more elements in FIG. 1. FIG. 2 illustrates a simplified block diagram of an exemplary system 200 for providing seamless redelivery of missing data in accordance with some embodiments. FIG. 3 shows a flow diagram of an exemplary process (e.g., method 300) of providing seamless redelivery of missing data in accordance with some embodiments. The system 200 includes the requesting client computer 110. By one approach, the requesting client computer 110 may include one or more client applications 208. For example, a client application 208 may include operations and/or programs executed by the requesting client computer 110 during an e-commerce activity over the internet. In such an example, the client application 208 may include a main client 210, a backfill client 212, and/or a control client/exception handler 214. In one example, the main client 210 may include an e-commerce application, a website, a streaming application, and/or the like. In another example, the backfill client 212 may correspond to a program that retrieves missing data from the message broker 102. In yet another example, the control client/exception handler 214 may correspond to a program that sends and/or receives control commands and/or exceptions from and/or to the message broker 102. By another approach, the message broker 102 may include one or more topics (e.g., correspond to groups in FIG. 1 as described above). In such an approach, the message broker 102 may include a main topic 202, a backfill topic 204, and/or a control topic 206. In one example, the main topic 202 may include messages being received at and/or sent from the message broker 102 to the requesting client computers 110. In another example, the backfill topic 204 may include missing data requested by one or more requesting client computers 110. In yet another example, the control topic 206 may include control messages and/or control events and/or control commands. For example, a control event may include an event flowing through the control topic 206. In such an example, the control event may have the following structure:

---

{
"id": String, - unique id, to identify a control event
"FromConsumerName": String, - name of the publisher
'ToConsumerName": String, - name of the intended reciever
"TopicName": Siring, - name of the main topic over which control action needs to be performed
"fromOffset": Integer, - starting offset of missed events of the main topic
"toOffset": Integer - ending offset of missed events of the main topic
"status": String - request / ack - status enum to indicate they kind of event.
Eg; request meaning consumer request to admin, ack meaning acked by admin.
}

---

By another approach, the system 200 may include the backup control circuit 112, the reconciliation control circuit 114, and/or the object store 108. In an illustrative non-limiting example, the requesting client computer 110 may, at step 302, generate a first data request in response to a user's e-commerce activity (e.g., using the client application 208 associated with a retailer's grocery app, a movie streaming app, etc.) over an internet. In one configuration, the message broker 102 may receive a first message (e.g., the first data request) and associate the first message with a first topic of the main topic 202 (e.g., write the first message in one or more partitions of the local memory storage 106 associated with the first topic). By one approach, the message broker 102 may couple to a source computer (not shown) to obtain the requested first data. In such an approach, the source computer may read the first message from the one or more partitions associated with the first topic and may provide a second message to the message broker 102. In one example, the message broker 102 may associate the second message with a second topic of the main topic 202 (e.g., the requested first data written into one or more partitions of the local memory storage 106 associated with the second topic). Alternatively, the second message may be stored at a particular offset in the one or more partitions associated with the first topic (e.g., the first message stored at offset 1 through 10 and the second message stored at offset 11 through 21 in the one or more partitions the first topic). As such, when several messages are stored in the same partition, each message is associated with a particular offset (e.g., a single offset value and/or an offset range).

In some implementations, the backup control circuit 112 may copy the first message and/or the second message as a plurality of object data from the local memory storage 106 into the object store 108 in accordance with a durational time that is longer than the durational time associated with messages stored in the local memory storage 106, at step 304. In some configurations, messages stored in the local memory storage 106 may be periodically (e.g., each time a message is stored, every whole or fraction of second/minute/hour, and/or one or more combination based on the topic) copied as object data to the object store 108. In such an implementation, the backup control circuit 112 may read messages from each topic (or group) associated with each node. For example, the backup control circuit 112 may read messages stored in the local memory storages 106 that are associated with the one or more first control circuits 104. In one scenario, the backup control circuit 112 may read and/or group together messages from a partition associated with a particular topic to form an object (e.g., 1000 messages) and store the grouped messages in the object store 108. By one approach, the reading, grouping, and/or storing of messages into object data in the object store 108 are performed in a continuous and/or always-on manner. By another approach, when the reading, grouping, and/or storing of messages into object data in the object store 108 have reached the end, the backup control circuit 112 may determine that there are no more messages to read from that partition. In response, the backup control circuit 112 may become idle. In one configuration, when messages have started being written and/or stored in the main topic 202 and/or the local memory storage 106, and/or partitions associated with topics that the messages are associated with, the backup control circuit 112 may again perform the reading, grouping, and/or storing of messages into object data in the object store 108 as described above.

By one approach, each object data stored in the local memory storage 106 may be stored and/or associated with a naming format including a corresponding topic or topic name and an offset value or an offset range. In such an approach, the naming format may include a corresponding partition or partition name or identifier. For example, a topic that is associated with a topic name "pricingChanges" stored in a partition associated with an identifier of "partition-1" located in an offset range of 10200 through 11700 may be associated with a name having a format that corresponds to "pricingChanges_10200_11700". Alternatively or in addition to, the naming format may instead correspond to "pricingChanges_partition-1_10200_11700". In some implementations, the backup control circuit 112 and/or the object store 108 may keep messages copied from the local memory storage 106 and/or partitions in the form of objects within containers. By one approach, each object's name may have metadata describing data residing in that object. In such an approach, the name may associate with and/or describe which partition's data it contains and offset range (e.g., test_partition1_100_200 may correspond to messages from 100 to 200 offset of partition 1 of topic 'test'). In some configurations, the backup control circuit 112 may only store and/or copy object data to the object store 108. In such a configuration, the backup control circuit 112 may not download and/or retrieve object data from the object store 108.

In some implementations, the backup control circuit 112 may associate an expiration time to each object data stored in the object store 108. For example, the expiration time may include a value corresponding to a number of days the object data is to be stored in the object store 108. In such an example, when the expiration time has been reached, the backup control circuit 112 may initiate deletion of the corresponding object data. In another example, the backup control circuit 112 may initiate overwriting the object data that has reached its expiration time with a newly stored and/or copied object data. In other implementations, the backup control circuit 112 may cause removal and/or deletion of stored object data in the object store 108 based on timestamp associated with the object data.

Continuing the illustrative non-limiting example above, in response to the first data request from the requesting client computer 110, the message broker 102 may provide the requested first data to the requesting client computer 110. By one approach, during processing of the requested first data, the requesting client computer 110 may determine that a data loss has occurred due to the requested first data being incomplete or that there is a missing data in the requested first data. In one configuration, in response to the determination that there is a missing data, the requesting client computer 110 may pause further processing of the requested first data and may provide or send a control event (or a control message) to the message broker 102 during an exception processing. For example, the reconciliation control circuit 114 may, at step 306, receive a second data request in response to a determination by the requesting client computer 110 that a data loss has occurred. By one approach, the message broker 102 may store, write, and/or associate the control event/messages (e.g., the second data request) with the control topic 206. In such an approach, the reconciliation control circuit 114 may be the only intended recipient of control messages/events stored in the control topic 206. In some implementations, the reconciliation control circuit 114 may periodically read messages stored/written in the control topic 206. In some implementations, the reconciliation control circuit 114 may subsequently read messages in response to the messages being stored/written to the control topic 206. Alternatively or in addition to, other requesting client computers 110 may provide or send a control event (or a control message) to the message broker 102 upon a determination that data loss has occurred. As such, an availability of an unprocessed message in the control topic 206 may indicate to the reconciliation control circuit 114 that a data loss has occurred and that a missing data is to be downloaded from the object store 108. In one scenario, the control event/messages may include a topic, partition identifier, and/or offset associated with the missing data. In such a scenario, in processing the control event/messages, the reconciliation control circuit 114 may determine the missing data to download from the object store 108.

In some configurations, in response to receiving the second data request, the reconciliation control circuit 114 may, at step 308, download the missing data from the object store 108. For example, the reconciliation control circuit 114 may download an object data that has a naming format that corresponds to the topic, the partition identifier, and/or the offset included in the control event/messages (or the second data request). In some embodiments, the reconciliation control circuit 114 may scan for the missing data in the object store 108. For example, the reconciliation control circuit 114 may parse each of the object names stored in the object store by searching and matching against the stored object names for the topic name associated with the missing data. Alternatively or in addition to, the reconciliation control circuit 114 may search and match the associated missing data partition number and/or identifier against the stored object names having a matching topic name. Alternatively or in addition to, the reconciliation control circuit 114 may compare and identify a beginning offset and an ending offset associated with the missing data with the stored object names having a matching topic name and a matching partition number. Alternatively or in addition to, the reconciliation control circuit 114 may determine whether the offset of the missing data falls in between the beginning offset and ending offset of one of the stored object names having a matching topic name and a matching partition number.

In some implementations, the reconciliation control circuit 114 may provide the missing data to the message broker in response to downloading of the missing data, at step 310. For example, the reconciliation control circuit 114 may provide the downloaded object data to the message broker 102. In such an implementation, the message broker 102 may store/write the missing data to the backfill topic 204. In one scenario, the backfill topic 204 may be associated with the main topic 202 and/or the topic that the missing data is associated with. In one configuration, each topic may be associated with a particular backfill topic. In another configuration, the message broker 102 may instead store/write the missing data back to the topic that the missing data is associated with. By one approach, in response to the reconciliation control circuit 114 providing the downloaded object data to the message broker 102, the reconciliation control circuit 114 may provide an acknowledgment message or another control event/message to the message broker 102. In one example, the message broker 102 may store/write the acknowledgment message or another control event/message to the control topic 206 to indicate a completion of the request for missing data. In some configurations, availability of the acknowledgment message or another control event/message in the backfill topic 204 may indicate to the requesting client computer 110 that the missing data is now available to be processed. By one approach, the requesting client computer 110 may read and/or receive the acknowledgment message or another control event/message and/or subsequently process the message to complete the requested first data. In some configurations, after processing the missing data, the requesting client computer 110 may break out of the exception processing and/or subsequently resume operation and/or execution of the client application 208. As such, the embodiments described herein ensure a robust data pipelines between a plurality of requesting client computers 110 and a plurality of source computers and/or servers providing the requested data and/or sourcing the requested data; thereby enhancing the scalability and/or resilience of, for example, the microservices architecture, queueing system architectures, to name a few. In some embodiments, the requesting client computer 110 may not undergo exception processing upon a determination of a missing data; instead, the requesting client computer 110 may continue operation and/or execution of the client application 208 by processing and/or generating messages associated with other topics while the requesting client computer 110, in parallel, goes through the process described above in obtaining the missing data.

Figure 4:
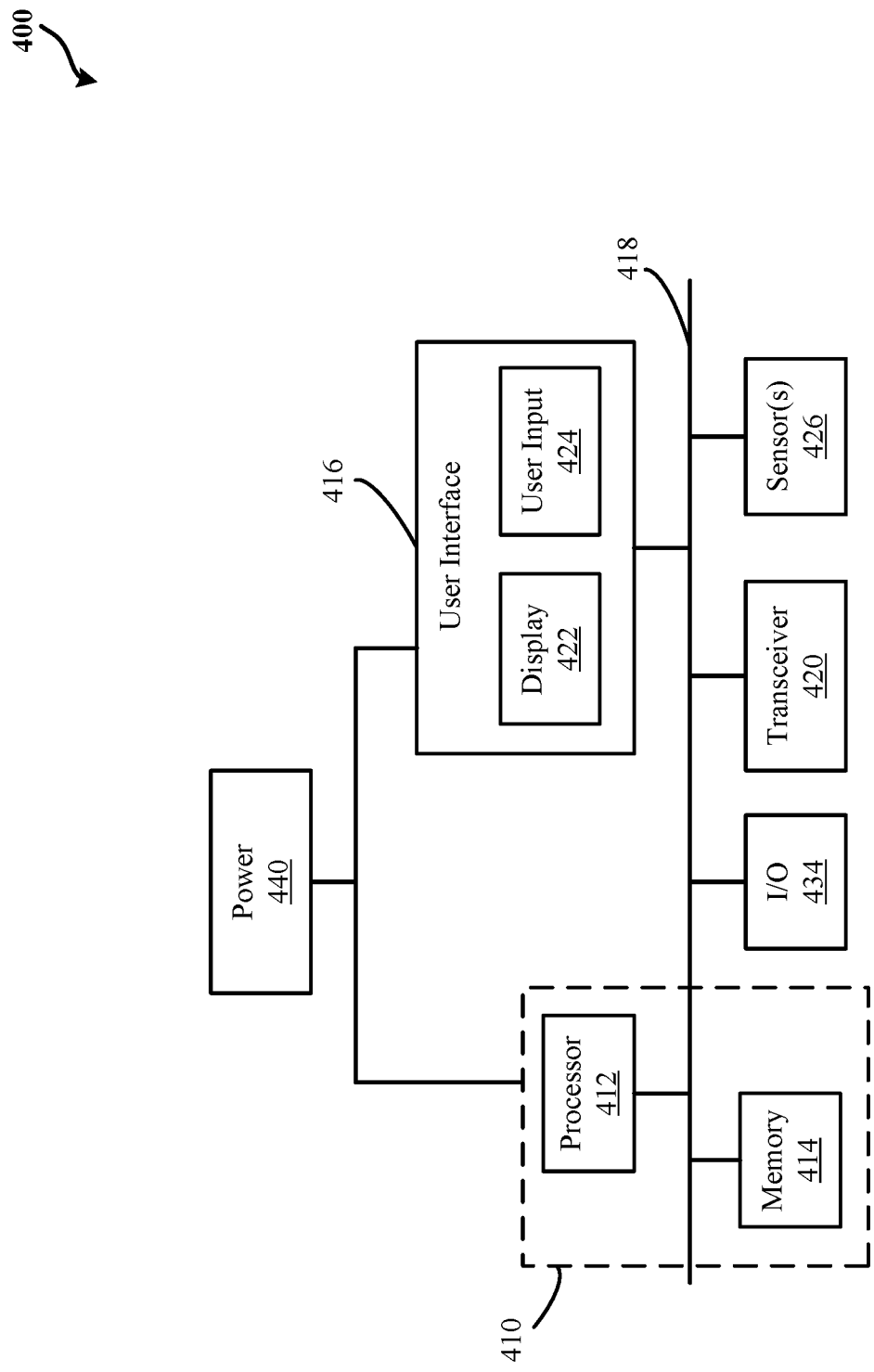
FIG. 4 illustrates an exemplary system for use in implementing methods, techniques, devices, apparatuses, systems, servers, sources and providing seamless redelivery of missing data, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the system 100 of FIG. 1, the system 200 of FIG. 2, the method 300 of FIG. 3, and/or other above or below mentioned systems or devices, or parts of such circuits, circuitry, functionality, systems, apparatuses, processes, or devices. For example, the system 400 may be used to implement some or all of the system for providing seamless redelivery of missing data from a message broker to a requesting client computer after an occurrence of an event leading to data loss, the requesting client computer 110, the message broker 102, the one or more first control circuits 104, the local memory storage 106, the backup control circuit 112, the object store 108, the plurality of memory storages 116, the reconciliation control circuit 114, the network 118, and/or other such components, circuitry, functionality and/or devices. However, the use of the system 400 or any portion thereof is certainly not required.

By way of example, the system 400 may comprise a processor module (or a control circuit) 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like. For example, the system 400 may implement the system for providing seamless redelivery of missing data from a message broker to a requesting client computer after an occurrence of an event leading to data loss with the one or more first control circuits 104, the backup control circuit 112, and/or the reconciliation control circuit 114 being the control circuit 412.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) interface 434 that allow one or more devices to couple with the system 400. The I/O interface can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing seamless redelivery of missing data from a message broker to a requesting client computer after an occurrence of an event leading to data loss, the system comprising:
   a requesting client computer of a plurality of requesting client computers generating a first data request in response to a user's e-commerce activity over an internet;
   a message broker comprising one or more first control circuits cooperatively working together as a plurality of nodes servicing a plurality of requests from the plurality of requesting client computers, wherein each node of the plurality of nodes corresponds to a broker of a plurality of brokers, wherein each broker of the plurality of brokers is associated with a local memory storage, and wherein the local memory storage comprises one or more partitions configured to store one or more messages of a plurality of messages sent to and received by the message broker in accordance with a first durational time;
   a backup control circuit coupled to the message broker via the internet and configured to copy the plurality of messages as a plurality of object data into an object store in accordance with a second durational time, wherein the second durational time is greater than the first durational time;
   the object store configured to store the plurality of object data and coupled to the backup control circuit, the object store comprising a plurality of memory storages remote from the local memory storage associated with each broker; and
   a reconciliation control circuit coupled to the object store and the message broker, the reconciliation control circuit configured to:
      receive a second data request in response to a determination by the requesting client computer that a data loss has occurred, wherein the second data request comprises a first group, a first partition, and a first offset associated with a missing data due to the data loss;
      in response to the receipt of the second data request, download the missing data from the object store; and
      in response to the download of the missing data, provide the missing data to the message broker, wherein the requesting client computer is configured to receive the missing data from the message broker.

2. The system of claim 1, wherein the user's e-commerce activity comprises one or more retail activities at an e-commerce website, streaming video, and streaming music.

3. The system of claim 1, wherein the local memory storage comprises a solid state drive and a nonvolatile flash memory, and wherein the plurality of memory storages comprises one or more hard disk drives.

4. The system of claim 1, wherein the local memory storage comprises one or more pieces of computer equipment on which information is stored and accessed faster than on the plurality of memory storages.

5. The system of claim 1, wherein the first durational time comprises a time less than a day and a time less than a 24-hour period.

6. The system of claim 1, wherein the one or more first control circuits, the backup control circuit, and the reconciliation control circuit are each distinct and separate control circuits.

7. The system of claim 1, wherein the object store is configured to only receive the plurality of object data from the backup control circuit and only provide the missing data to the reconciliation control circuit.

8. The system of claim 1, wherein each message of the one or more messages is associated with a corresponding group of a plurality of groups, a corresponding partition of the one or more partitions, and a corresponding offset within the corresponding partition, and wherein each object data of the plurality of object data is stored in the object store with a particular naming format corresponding to the corresponding group, the corresponding partition, and the corresponding offset.

9. The system of claim 8, wherein the reconciliation control circuit is further configured to perform a search of a first object data corresponding to the missing data by:
   finding one or more set of object data matching a first naming format corresponding to the first group and the first partition of the missing data in a plurality of naming formats associated with the plurality of object data stored in the object store; and
   determining the first object data from the one or more set of object data based on a determination that an identified offset associated with one of the one or more set of object data comprises the first offset associated with the missing data, wherein the downloaded missing data from the object store comprises the first object data.

10. The system of claim 9, wherein the message broker is configured to store the missing data received from the reconciliation control circuit in a particular partition associated with a particular group accessible only by the requesting client computer.

11. A method for providing seamless redelivery of missing data from a message broker to a requesting client computer after an occurrence of an event leading to data loss, the method comprising:
   generating, by a requesting client computer of a plurality of requesting client computers, a first data request in response to a user's e-commerce activity over an internet;
   copying, by a backup control circuit coupled to a message broker via the internet, a plurality of messages as a plurality of object data into an object store in accordance with a second durational time, wherein the message broker comprises one or more first control circuits cooperatively working together as a plurality of nodes servicing a plurality of requests from the plurality of requesting client computers, wherein each node of the plurality of nodes corresponds to a broker of a plurality of brokers, wherein each broker of the plurality of brokers is associated with a local memory storage, wherein the local memory storage comprises one or more partitions configured to store one or more messages of the plurality of messages sent to and received by the message broker in accordance with a first durational time, wherein the second durational time is greater than the first durational time, and wherein the object store is configured to store the plurality of object data and is coupled to the backup control circuit, the object store comprising a plurality of memory storages remote from the local memory storage associated with each broker;
   receiving, by a reconciliation control circuit coupled to the object store and the message broker, a second data request in response to a determination by the requesting client computer that a data loss has occurred, wherein the second data request comprises a first group, a first partition, and a first offset associated with a missing data due to the data loss;
   in response to receiving the second data request, downloading the missing data from the object store; and
   in response to the downloading of the missing data, providing the missing data to the message broker, wherein the requesting client computer is configured to receive the missing data from the message broker.

12. The method of claim 11, wherein the user's e-commerce activity comprises one or more retail activities at an e-commerce website, streaming video, and streaming music.

13. The method of claim 11, wherein the local memory storage comprises a solid state drive and a nonvolatile flash memory, and wherein the plurality of memory storages comprises one or more hard disk drives.

14. The method of claim 11, wherein the local memory storage comprises one or more pieces of computer equipment on which information is stored and accessed faster than on the plurality of memory storages.

15. The method of claim 11, wherein the first durational time comprises a time less than a day and a time less than a 24-hour period.

16. The method of claim 11, wherein the one or more first control circuits, the backup control circuit, and the reconciliation control circuit are each distinct and separate control circuits.

17. The method of claim 11, wherein the object store is configured to only receive the plurality of object data from the backup control circuit and only provide the missing data to the reconciliation control circuit.

18. The method of claim 11, wherein each message of the one or more messages is associated with a corresponding group of a plurality of groups, a corresponding partition of the one or more partitions, and a corresponding offset within the corresponding partition, and wherein each object data of the plurality of object data is stored in the object store with a particular naming format corresponding to the corresponding group, the corresponding partition, and the corresponding offset.

19. The method of claim 18, further comprising:
   finding, by the reconciliation control circuit, one or more set of object data matching a first naming format corresponding to the first group and the first partition of the missing data in a plurality of naming formats associated with the plurality of object data stored in the object store; and
   determining, by the reconciliation control circuit, a first object data from the one or more set of object data based on a determination that an identified offset associated with one of the one or more set of object data comprises the first offset associated with the missing data, wherein the downloaded missing data from the object store comprises the first object data.

20. The method of claim 19, further comprising storing, by the message broker, the missing data received from the reconciliation control circuit in a particular partition associated with a particular group accessible only by the requesting client computer.

* * * * *